J. H. SWAN.

Folding Chair.

No. 1,750. Reissued Aug. 30, 1864.

Witnesses:

Daniel S. Mead Jr.

M. J. Livingston

Inventor:

James H. Swan

N. PETERS. Photo-Lithographer, Washington, D. C.

UNITED STATES PATENT OFFICE.

JAMES G. ENGLISH AND EDWIN F. MERSICK, OF NEW HAVEN, CONNECTICUT, ASSIGNEES, BY MESNE ASSIGNMENTS, OF JAMES H. SWAN.

IMPROVED FOLDING CHAIR.

Specification forming part of Letters Patent No. 29,750, dated August 21, 1860; Reissue No. 1,750, dated August 30, 1864.

*To all whom it may concern:*

Be it known that JAMES H. SWAN, of the city, county, and State of New York, did invent a new and Improved Folding and Reclining Chair; and we do hereby declare that the following is a full, clear, and exact description of the same, reference being had to the annexed drawings, making a part of this specification.

Figure 1:
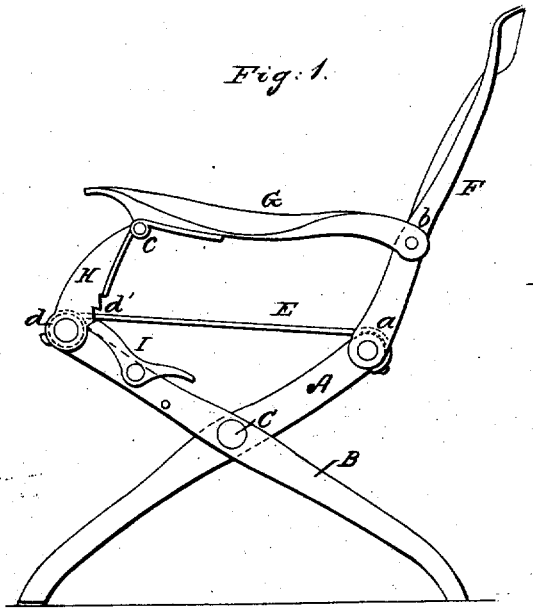
Figure 2:
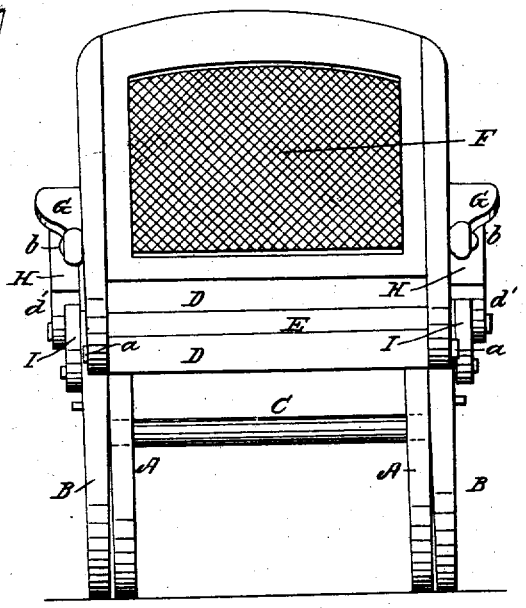
Figure 3:
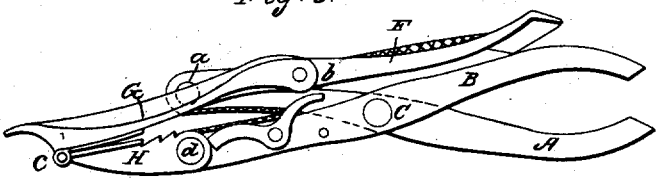

In said drawings, Figure 1 is a side elevation of a folding arm-chair, embodying the principles of this invention, in an unfolded state, ready for use. Fig. 2 is a back elevation of the same. Fig. 3 is a side view of the same in a folded state.

Similar letters of reference indicate corresponding parts in the several figures.

The object of this invention is to obtain a chair provided with back and arms which may be folded within a small compass, also to have a back capable of being inclined more or less at the option of the occupant.

The invention is designed to facilitate and economize in the transportation of chairs of the class alluded to, and to render the same more convenient and altogether more desirable in cases where they require to be frequently folded when not in use—for instance, when obtained for balconies, piazzas, &c.—it being an object to have them fold as compactly as possible, so as to monopolize the least possible room. To this end jointed cross-legs are employed, and the back of the chair being attached to the rear and upper ends of the front legs of the same by joints, while the back is connected to the upper and front ends of the rear legs by means of jointed arms, substantially as hereinafter described.

To enable those skilled in the art to fully understand and construct this chair, we will proceed to describe its construction and operation.

A A B B represent cross-legs, which are connected by a traverse-bar, C, the latter forming a joint and connection for the legs, so that the latter may fold together. The upper ends of each pair of legs A A B B are connected by traverse-bars D, and to these bars any suitable fabric, E, may be attached to form the seat, the fabric requiring to be of such a nature that it may fold readily as the legs are drawn together. To the upper ends of the legs A A the lower end of the back F is attached by joints *a a*, the back being allowed to work freely on the joints *a*. To each side of the back F there is attached by a joint, *b*, an arm, G, and to the front ends of the arms there are connected by joints or hinges *c* bars H, the lower ends of which are secured by joints *d* to the upper ends of the legs B B. The bars H are notched at their back sides, as shown at *d'*, to receive the ends of the stops or pawls I, which are secured to the outer sides of the legs B.

The back F may be constructed in the ordinary way; but in order to obtain lightness it would be preferable to have it formed of a frame filled in with cane, as shown in Fig. 2.

From the above description it will be seen that the back F may be inclined more or less by adjusting the pawls I higher or lower in the notches of the bars H. The higher the pawls are adjusted in the notches *d'* the greater the inclination of the back, and vice versa.

In order to fold the chair compactly, the pawls I are disengaged from the notches *d'*, the back F turned over backward, and the legs A A B B folded together, as shown clearly in Fig. 3, the whole being thereby comprised within a very small space.

We are aware that cross-legs have been used, and also cross-legs with a back attached; but in the latter case the back is attached directly to the legs, and the chair when folded is equal in length to the back and legs. By this invention it will be seen that by attaching the back F to the legs A by joints, and thereby admitting of the folding backward of the back, the chair when folded is materially shortened and rendered very compact.

We do not claim the employment or use of cross-legs, nor the jointed arms, for they have been previously used; but We do claim as new and desire to secure by Letters Patent—

1. A folding chair composed of jointed cross-legs with a flexible seat, having combined with it a back and arms, the back being attached to the rear and upper ends of the front legs by hinge-joints, as described, while the arms are connected in like manner with the front and upper ends of the rear legs, substantially as set forth.

2. The combination of a cross-leg chair with flexible seat and a back and arms, the whole constituting a folding arm-chair, when arranged for operation as described, so that the folding of the chair is or may be effected by drawing the legs together and by swinging the back over and backward, substantially in the manner and for the purposes set forth.

3. An arm-chair, folding as described, in which the back is capable of adjustment, substantially in the manner and for the purposes set forth.

4. In folding arm-chairs operating as described, the employment of jointed arms, in combination with adjustable stops or pawls, as set forth.

In testimony whereof we have signed our names to this specification before two subscribing witnesses.

JAMES G. ENGLISH.
EDWIN F. MERSICK.

Witnesses:
JOHN M. WHITNEY,
NATHAN L. MYERS.